United States Patent
Chang et al.

(10) Patent No.: US 9,707,857 B2
(45) Date of Patent: Jul. 18, 2017

(54) SYSTEM AND METHOD FOR ADJUSTING BATTERY PACK STATE OF CHARGE LIMITS

(71) Applicant: Ford Global Technologies, LLC, Dearborn, MI (US)

(72) Inventors: Xiaoguang Chang, Northville, MI (US); Chuan He, Northville, MI (US); Xu Wang, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/157,095

(22) Filed: May 17, 2016

(65) Prior Publication Data

US 2016/0257217 A1 Sep. 8, 2016

Related U.S. Application Data

(62) Division of application No. 14/052,645, filed on Oct. 11, 2013, now Pat. No. 9,340,120.

(51) Int. Cl.
*B60L 11/18* (2006.01)
*H02J 7/00* (2006.01)

(52) U.S. Cl.
CPC ....... *B60L 11/1864* (2013.01); *B60L 11/1861* (2013.01); *B60L 11/1862* (2013.01); *H02J 7/00* (2013.01); *H02J 7/0029* (2013.01); *B60L 2240/26* (2013.01); *B60L 2240/545* (2013.01); *H02J 2007/004* (2013.01); *H02J 2007/0037* (2013.01); *Y02T 10/7005* (2013.01); *Y02T 10/7077* (2013.01); *Y10S 903/903* (2013.01)

(58) Field of Classification Search
CPC .............. B60L 11/1864; B60L 11/1861; B60L 2240/26; B60L 2240/545; B60L 11/1862; Y10S 903/903; Y02T 10/7077; Y02T 10/7005; H02J 7/0029; H02J 2007/0037; H02J 2007/004; H02J 7/00

See application file for complete search history.

(56) References Cited

U.S. PATENT DOCUMENTS

| | | | |
|---|---|---|---|
| 4,876,513 A | 10/1989 | Brilmyer et al. | |
| 5,778,326 A | 7/1998 | Moroto et al. | |
| 7,463,958 B2 | 12/2008 | Suzuki | |
| 7,934,573 B2 | 5/2011 | Fassnacht | |
| 8,138,720 B2 | 3/2012 | Snyder et al. | |
| 8,562,484 B1 * | 10/2013 | Nedorezov | B60W 10/02 477/32 |
| 2006/0246329 A1 | 11/2006 | Gopal et al. | |
| 2010/0274656 A1 * | 10/2010 | Genschel | G06Q 30/00 705/14.27 |
| 2013/0079962 A1 | 3/2013 | Ishikawa et al. | |

(Continued)

*Primary Examiner* — Richard Camby
(74) *Attorney, Agent, or Firm* — David Kelley; McCoy Russell LLP

(57) ABSTRACT

Systems and methods for operating a battery pack supplying power to propel a vehicle are disclosed. One example method comprises, adjusting a battery pack state of charge window in response to vehicle mass. Adjusting the battery pack state of charge window in response to vehicle mass may allow the battery pack to provide an increased amount of energy to a motor so that the motor may provide torque to a driveline for a longer period of time and/or absorb more vehicle generator produced power during vehicle operations.

7 Claims, 6 Drawing Sheets

(56) References Cited

U.S. PATENT DOCUMENTS

| | | |
|---|---|---|
| 2014/0012450 A1 | 1/2014 | Laing |
| 2014/0116793 A1 | 5/2014 | Pelletier et al. |
| 2014/0167656 A1 | 6/2014 | Yamada |
| 2014/0172282 A1 | 6/2014 | Feng et al. |
| 2015/0105948 A1 | 4/2015 | Chang et al. |
| 2015/0241310 A1* | 8/2015 | Brown .................... G06F 17/18 702/179 |

* cited by examiner

SYSTEM AND METHOD FOR ADJUSTING BATTERY PACK STATE OF CHARGE LIMITS

CROSS REFERENCE TO RELATED APPLICATIONS

The present application is a divisional of U.S. patent application Ser. No. 14/052,645, entitled "SYSTEM AND METHOD FOR ADJUSTING BATTERY PACK STATE OF CHARGE LIMITS," filed on Oct. 11, 2013, now U.S. Pat. No. 9,340,120, the entire contents of which are hereby incorporated by reference for all purposes.

TECHNICAL FIELD

The present application relates to operating a battery pack supplying power to a vehicle.

BACKGROUND AND SUMMARY

Hybrid vehicles may include an internal combustion engine and an electric motor to provide propulsion force to vehicle wheels. The hybrid vehicle may provide the performance and functionality of a vehicle having a larger displacement internal combustion engine via a smaller displacement internal combustion engine and the electric motor. The electric motor may augment engine torque during high driver demand conditions so that the vehicle may be provided torque that is similar to that of a larger displacement internal combustion engine. However, the electric motor may not be able to assist the smaller displacement engine during conditions when battery state of charge (SOC) is at a lower level. One way to reduce the possibility of having an insufficient amount of torque available at the electric motor is to increase battery pack size so that a battery supplying power to the electric motor stores a greater amount of electrical energy. However, adding additional battery pack increases battery pack cost and battery pack volume. Therefore, it would be desirable to provide additional charge storage capacity and additional charge souring capacity without having to increase battery volume.

The inventors herein have developed a system for operating a battery pack of a vehicle, comprising: a battery pack including a plurality of battery cells; and a controller including non-transitory instructions for adjusting battery pack state of charge operating thresholds in response to vehicle mass.

By adjusting battery pack state of charge operating thresholds in response to vehicle mass, it may be possible to provide the technical result of increasing stored charge in a battery so that a vehicle may be propelled for a longer period of time via an electric motor when vehicle mass increases. Additionally, the battery discharge amount may be increased so that the battery may be discharged to a lower level when vehicle mass increases. In this way, an electrical motor propelling a vehicle may operate for a longer period of time as compared to if battery state of charge operating thresholds were not adjusted. Further, the battery pack charging and discharging power may be adjusted in response to vehicle mass so that additional motor torque may be provided when vehicle mass increases.

The present description may provide several advantages. In particular, the approach provides for a way to increase an amount of energy and/or power delivered by a motor to a vehicle driveline. Further, high duty vehicles may be operated at higher loads where a battery SOC window is extended; however, the SOC window extent may be decreased when the high duty vehicle is operated at lower loads so that battery life may be extended. Further still, the approach also improves the rate of battery charging and discharging as vehicle mass increases.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description is related to adjusting battery pack SOC limits. A vehicle battery pack may include the features and devices included in the description of FIG. 1. The vehicle battery pack may be positioned in a vehicle as shown in FIG. 2. The battery pack may provide the operating sequence shown in FIG. 3 when the method of FIG. 4 is included in the system of FIGS. 1 and 2. FIG. 4 describes a SOC window and how battery operation is affected when SOC limits are adjusted.

Figure 1:
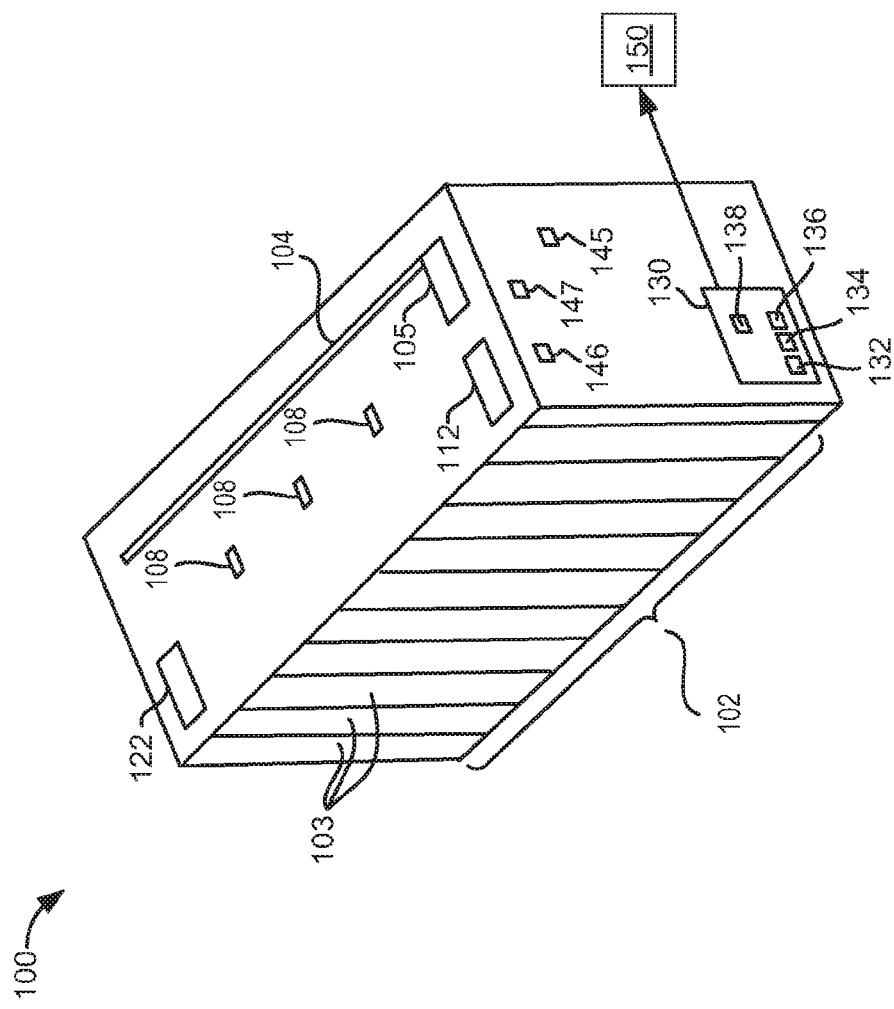
FIG. 1 shows a schematic view of a vehicle battery pack.
Figure 2:
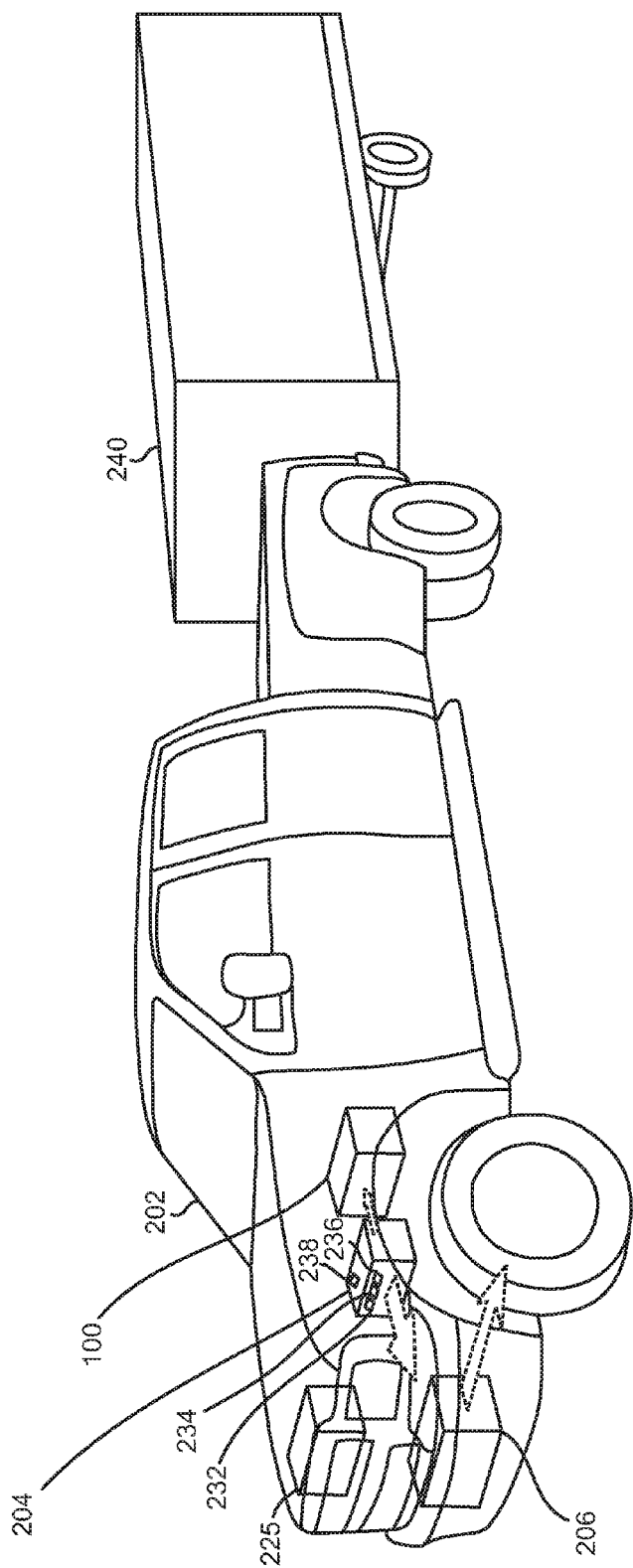
FIG. 2 shows a schematic view of a vehicle battery pack in a vehicle.

Referring now to FIG. 1, an example battery pack 100 is illustrated. Battery pack 100 includes battery cell stack 102 comprised of a plurality of battery cells 103. Battery pack 100 may be air cooled by fan 112, or alternatively, liquid cooled via optional coolant circuit 104 and pump 105. Battery cells 103 may be lithium-ion, nickel-cadmium, or other known chemistries. Battery cells 103 may be electrically connected in series and/or parallel. Battery cells electrically connected in series increase battery pack output voltage. Battery cells electrically connected in parallel increase the battery capacity or amp-hour rating. Battery pack temperature may be sensed or measured via battery pack temperature sensor 108. In some examples, a battery temperature sensor may be supplied for each/or several battery cells 103.

Battery fan 112 and/or pump 105 may be selectively activated and deactivated in response to battery pack temperature sensor 108. Further, a speed of rotation of battery fan 112 and/or pump 105 may be varied in response to battery pack temperature sensor 108. For example, if battery pack temperature is approaching a high temperature threshold, a speed of battery fan 112 and/or pump 105 may be increased. Alternatively, if battery pack temperature is decreasing and approaching a lower temperature threshold, a speed of battery fan 112 and/or pump 105 may be reduced.

During conditions when battery pack 100 is at lower temperatures, battery pack heating elements 122 may be activated to increase the temperature of battery pack 100. In one example, if battery temperature sensor 108 indicates a low battery temperature, heating elements 122 are activated to increase battery temperature so that battery efficiency may be increased.

Battery pack 100 also includes a battery controller 130 including inputs and outputs 132. Battery controller 130 also includes non-transitory memory or read-only memory 134 for storing executable instructions. Battery controller 130 also includes volatile memory 136 for storing variables and instructions. Battery controller 130 also includes a central processing unit 138 that is in electrical communication with volatile memory 136, read-only memory 134, and inputs and outputs 132. Inputs and outputs 132 are in electrical communication with battery pack sensors and actuators (e.g., temperature sensor 108). Battery controller 130 is in electrical communication with user display or light 150 for indicating battery pack degradation. Battery controller 130 may also limit battery pack output power via limiting current through current limiting device 145 (e.g., transistor, thyristor, FET, MOSFET, etc.). In some examples, battery pack 100 may include humidity sensor 146 and barometric pressure sensor 147. Alternatively, battery pack 100 may receive barometric pressure and humidity from a vehicle controller. Battery controller 130 may also communicate with other vehicle controllers such as powertrain controllers, propulsion motor controllers, transmission controllers, etc. The battery controller may communicate SOC limits to other controllers to limit battery output power.

Referring now to FIG. 2, an example vehicle 202 in which battery pack 100 may be included is shown. Vehicle 202 may include a motor 206 to propel vehicle 202 and a vehicle controller 204. Vehicle controller 204 controls motor 206 in response to vehicle conditions and driver demand torque. Motor 206 is supplied electrical power via battery pack 100. In some examples, vehicle controller 204 may control both motor 206 and an optional internal combustion engine 225.

Vehicle controller 204 also includes inputs and outputs 232. Vehicle controller 204 also includes non-transitory memory or read-only memory 234 for storing executable instructions. Vehicle controller 230 also includes volatile memory 236 for storing variables and instructions. Vehicle controller 230 also includes a central processing unit 238 that is in electrical communication with volatile memory 236, read-only memory 234, and inputs and outputs 232. Inputs and outputs 232 are in electrical communication with battery pack controller 130 via a CAN bus, for example.

Thus, the system of FIGS. 1 and 2 provides for a system for operating a battery pack of a vehicle, comprising: a battery pack including a plurality of battery cells; and a controller including non-transitory instructions for adjusting battery pack state of charge operating thresholds in response to vehicle mass. The system includes where vehicle mass includes vehicle cargo and passengers. The system includes where vehicle mass includes mass of a trailer mechanically coupled to the vehicle.

In some examples, the system includes where adjusting battery pack state of charge includes increasing a battery pack state of charge battery charging maximum threshold. The system includes where adjusting battery pack state of charge includes decreasing a battery pack state of charge battery discharging minimum threshold. The system includes where adjusting battery pack state of charge includes increasing a battery pack charging energy and/or power in response to an increase in vehicle mass. The system includes where adjusting battery pack state of charge includes increasing a battery pack discharging energy and/or power in response to an increase in vehicle mass.

In another example, the system of FIGS. 1 and 2 provides for a system for operating a battery pack of a vehicle, comprising: a battery pack including a plurality of battery cells; and a controller including non-transitory instructions for adjusting battery pack state of charge operating thresholds in response to environmental conditions that affect power of an engine. The system includes where the environmental conditions include barometric pressure. The system includes where the environmental conditions include humidity.

The system also includes where adjusting battery pack state of charge operating thresholds includes increasing a battery pack state of charge battery charging maximum threshold in response to an environmental condition that decreases power of an engine. The system includes where adjusting battery pack state of charge operating thresholds includes decreasing a battery pack state of charge battery discharging minimum threshold in response to the environmental condition that decreases power of the engine. The system includes where adjusting the battery pack state of charge operating thresholds includes increasing a battery pack charging energy and/or power in response to the environmental condition that decreases power of the engine. The system includes where adjusting the battery pack state of charge operating thresholds includes increasing a battery pack discharging energy and/or power in response to the environmental condition that decreases power of the engine.

Figure 3:
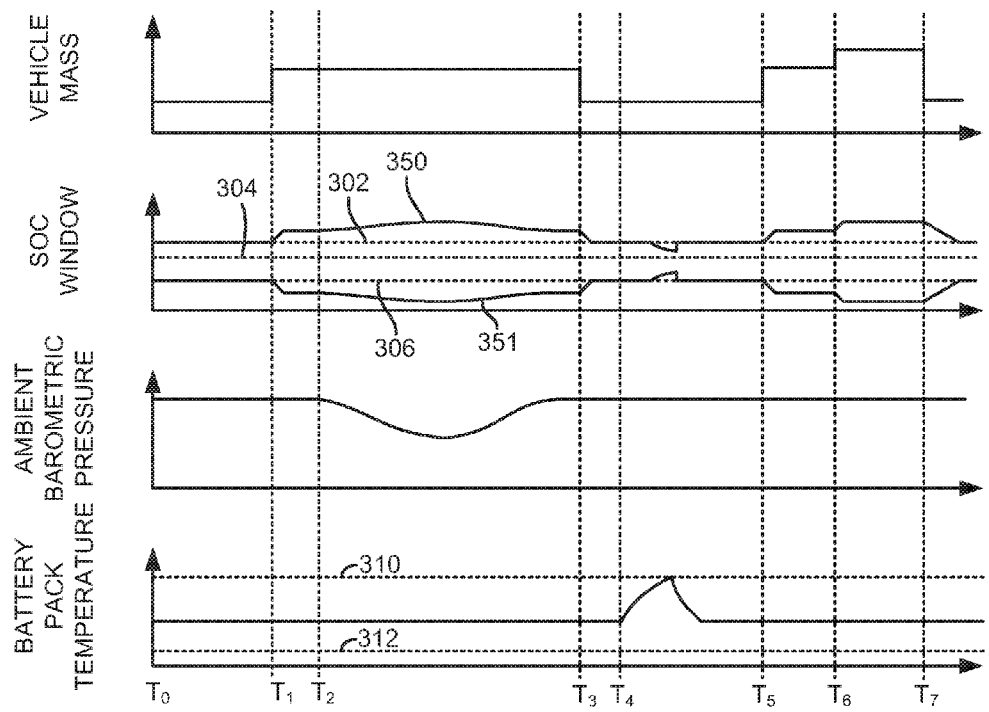
FIG. 3 shows an example battery pack operating sequence.
Figure 4:
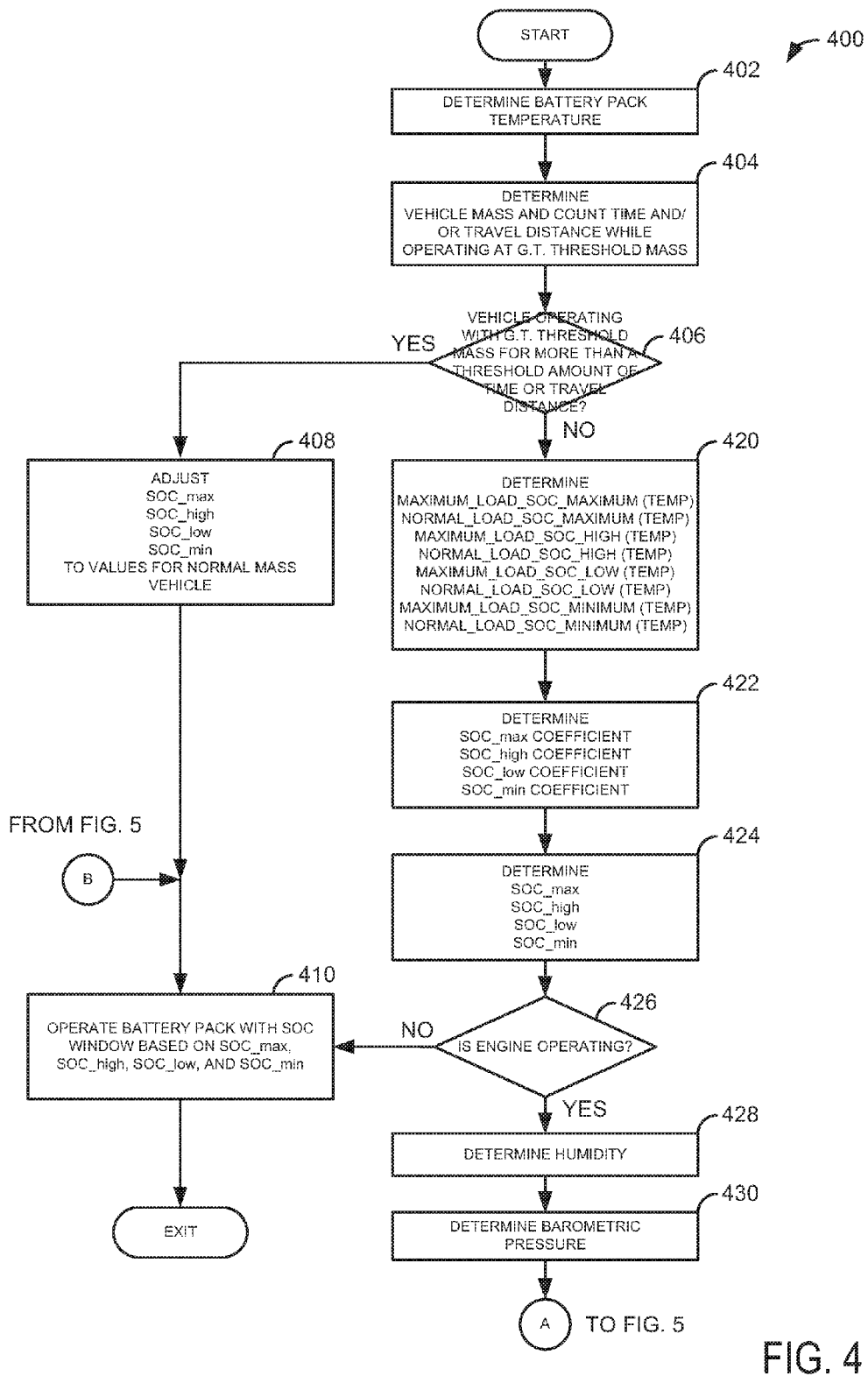
FIGS. 4 and 5 show a flowchart of a method or adjusting battery pack state of charge limits.

Referring now to FIG. 3, an example prophetic battery pack operating sequence is shown. The battery operating sequence of FIG. 3 may be provided by the system shown in FIGS. 1 and 2. Further, the battery operating sequence may be the output of the method of FIGS. 4 and 5. FIG. 3 includes vertical markers T0-T7 that show times of particular interest in the sequence.

The first plot from the top of FIG. 3 is a plot of estimated vehicle mass versus time. Vehicle mass may be estimated as is described in the method of FIGS. 4 and 5. The X axis represents time and time increases from the left to right side of FIG. 3. The Y axis represents vehicle mass and vehicle mass increases in the direction of the Y axis arrow. Vehicle mass may include the base vehicle, passengers, vehicle payload, and any towed trailers.

The second plot from the top of FIG. 3 is a plot of battery pack SOC window versus time. The X axis represents time and time increases from the left to right side of FIG. 3. The Y axis represents estimated battery pack SOC and SOC increases in the direction of the Y axis arrow. SOC is zero at the X axis. Solid line 350 represents a battery pack SOC_high, which is the highest SOC point that battery pack is allowed to operation at full charge power, and solid line 351 represents a SOC_low, which is the lowest SOC value that the battery pack is allowed to operate at full discharge power. When SOC is less than SOC_low or greater than SOC_high, the battery pack charge and/or discharge power is reduced to maintain battery operation in the SOC window defined by SOC_high and SOC_low. The variable SOC_max is adjusted above SOC_high, and SOC_min is adjusted below SOC_low (e.g., SOC_max is 70% and SOC_high is 65%; SOC_low is 35% and SOC_min is 30%). SOC_max is the maximum SOC value that battery pack is allowed to be charged to and available battery pack charge power is zero at SOC_max. SOC_min is the minimum value that the battery pack is allowed to be discharged to and available battery pack discharge power is zero at SOC_min.

Horizontal line 302 represents a SOC_high for normal vehicle conditions (e.g., unloaded vehicle weight plus a predetermined amount of additional weight). Horizontal line 304 represents 50% SOC. SOC may be described as a percentage of charge stored in a battery referenced to the battery capacity. For example, if a battery has a 100 ampere-hour capacity and the SOC is 50%, the battery has 50 ampere-hours at its present storage level. Horizontal line 304 represents a SOC_low for normal vehicle conditions. The SOC window includes a maximum SOC value, a high SOC value, a low SOC value, and a minimum SOC value which are described in greater detail in the description of FIG. 6; however, the SOC_max and SOC_min values are not shown so as to make the plot more interpretable. SOC_max and SOC_min may follow the trends of SOC_high and SOC_low.

The third plot from the top of FIG. 3 is a plot of ambient barometric pressure at which the vehicle is operating. Barometric pressure may affect engine operation when a vehicle is operated at higher altitudes. Therefore, it may be desirable to adjust the SOC window at higher altitudes (e.g., lower barometric pressures) so that additional power may be available to the motor to compensate for engine power loss due to low barometric pressure. The X axis represents time and time increases from the left to right side of FIG. 3. The Y axis represents ambient barometric pressure and ambient barometric pressure increases in the direction of the Y axis arrow.

The fourth plot from the top of FIG. 3 is a plot of battery pack temperature versus time. The X axis represents time and time increases from the left to right side of FIG. 3. The Y axis represents battery pack temperature and battery pack temperature increases in the direction of the Y axis arrow. Horizontal line 310 represents a battery pack higher temperature operating limit. Horizontal line 312 represents a battery pack lower temperature operating limit.

At time T0, the vehicle in which a battery pack operates is operating at nominal conditions where vehicle mass is less than a threshold mass. The vehicle mass is at a lower level and it includes the unloaded vehicle weight plus a predetermined amount of weight. The battery SOC window is at a base level at nominal vehicle operating conditions. Therefore, the SOC_high 350 is at the level 302 and SOC_low 351 is at the level 306. Barometric pressure is constant and at a higher level (e.g., sea level). The battery pack temperature is at a middle level.

At time T1, the vehicle mass increases. The vehicle mass may increase via mechanically coupling a trailer to the vehicle and/or adding a payload (e.g., bricks, lumber, people, etc.). The change in vehicle mass may be determined via the method described in the method of FIGS. 4 and 5, or it may be estimated from vehicle ride height sensors. The SOC window is expanded in response to the increase in vehicle mass. In particular the SOC_high is increased and the SOC_low is decreased. By increasing the SOC_high, the battery may store more charge and the battery charging rate may be increased at higher levels of SOC. Decreasing the SOC_low allows the battery to discharge to a lower level and the discharge rate may also be increased as the SOC_low is lowered. The ambient barometric pressure remains constant as does the battery pack temperature.

Between time T1 and time T2, the SOC_high and SOC_low values are slew rate limited so that changes in motor torque that result from increased SOC_high and decreased SOC_low may be less noticeable to a driver. The vehicle in which the battery pack operates travels according to driver demands (not shown).

At time T2, the ambient barometric pressure begins to decrease in response to the vehicle in which the battery pack operates ascends to a higher altitude. Since less air is available at higher altitudes as compared to lower altitudes, available engine power may be diminished for naturally aspirated engines. The loss in engine power may be at least partially overcome via increasing the SOC window since increasing the SOC window increases the battery discharge rate at lower SOC levels and increases the battery charge rate at higher SOC levels. The SOC window is adjusted proportionately with the decrease in barometric pressure and the increase in vehicle altitude. The battery pack temperature remains at a middle level.

Between time T2 and time T3, the barometric pressure decreases as the vehicle travels to a higher altitude and then increases as the vehicle travels to a lower altitude near time T3. The SOC window is adjusted in response to the barometric pressure. Further, the SOC remains expanded in response to the increase in vehicle mass that occurred at time T1. The vehicle mass remains constant as does the battery pack temperature.

At time T3, the vehicle mass is reduced via decoupling a trailer from the vehicle and/or reducing the vehicle payload. The SOC window is contracted toward the nominal condition SOC window. The ambient barometric pressure remains constant as does the battery pack temperature.

Between time T3 and time T4, the SOC_high and SOC_low values are slew rate limited so that changes in motor torque that result from decreasing SOC_high and increasing SOC_low may be less noticeable to a driver. The ambient barometric pressure and battery pack temperature remain at constant unchanged values.

At time T4, battery pack temperature begins to increase. The battery pack temperature may begin to increase in response to warmer ambient air temperature, increased current flow into or out of the battery, or other conditions. Vehicle mass and ambient barometric pressure are unchanged and constant.

Between time T4 and time T5, the battery pack temperature approaches the battery pack higher temperature limit. The battery SOC_high is decreased and the SOC_low is increased in response to the battery temperature. By limiting the SOC window at higher battery temperatures, the possibility of battery pack degradation may be reduced. Shortly after approaching the battery pack higher limit, the battery pack temperature begins to decrease and the SOC window is returned to the nominal battery pack SOC window.

At time T5, the vehicle mass is increased a second time. The SOC window is expanded by increasing the SOC_high and decreasing the SOC_low. Further, the rate of change to the SOC_high and SOC_low is slew rate limited so as to reduce the possibility of the driver detecting any operational difference. The ambient barometric pressure and battery pack temperature are at constant values.

At time T6, the vehicle mass is increased a third time. The SOC window is expanded further by increasing the SOC_high and decreasing the SOC_low. Additionally, the rate of change to the SOC_high and SOC_low is slew rate limited so as to reduce the possibility of the driver detecting any operational difference. The ambient barometric pressure and battery pack temperature are at constant values.

At time T7, the vehicle mass is reduced to a lower level where it includes the unloaded vehicle weight plus a predetermined amount of weight. The SOC window is reduced in span (e.g., SOC_high is reduced and SOC_low is increased) in response to the reduction in vehicle mass. The ambient barometric pressure and battery pack temperature remain at constant values.

In this way, the battery pack SOC window may be adjusted in response to vehicle mass and ambient barometric pressure so that additional range and performance may be provided via a motor when the engine is able to produce less torque than at sea level or when engine load is increases such that vehicle performance may be reduced.

Figure 5:
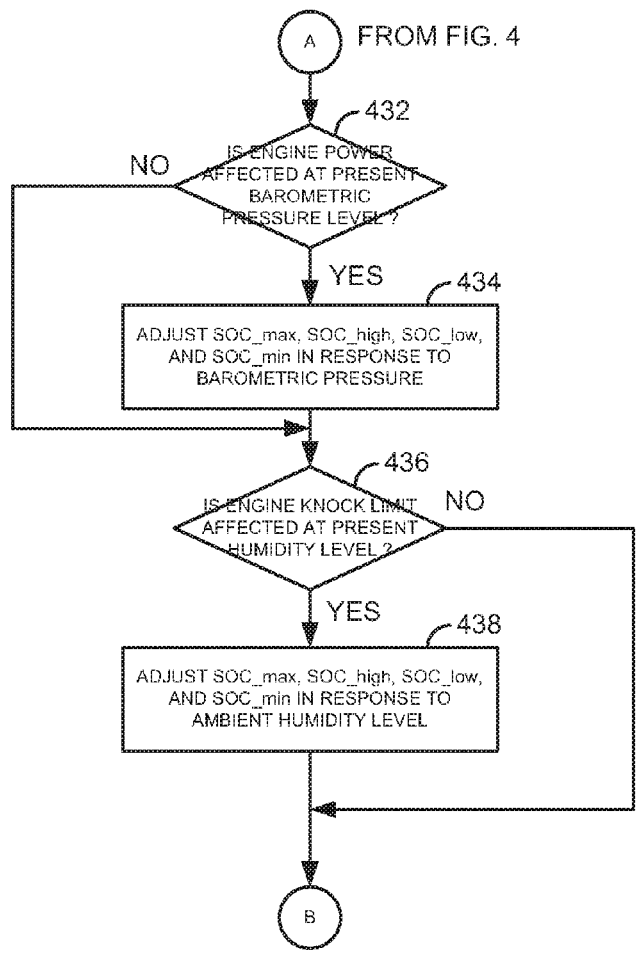

Referring now to FIGS. 4 and 5, a method for operating a battery pack in a vehicle is shown. The method of FIGS. 4 and 5 may be stored in non-transitory memory of a controller as executable instructions in a system as is shown in FIGS. 1 and 2. Further, the method of FIG. 4 may provide and operating sequence as is shown in FIG. 3.

At 402, method 400 determines battery pack temperature. Battery pack temperature may be determined via a battery pack temperature sensor. Alternatively, battery pack temperature may be estimated via a model. Method 400 proceeds to 404 after battery temperature is determined.

At 404, method 400 determines vehicle mass and counts time and/or distance a vehicle has travelled while vehicle mass is greater than a baseline vehicle mass plus a predetermined mass. Vehicle mass includes mass of the vehicle, the vehicle's payload, and mass of any towed trailer.

In one example, vehicle mass may be determined at constant vehicle speed as follows:

Driveline torque=road load+grade based torque $$T\_wh_1 = R\_rr * M\_v * g * \sin(\theta_1) + T\_rl_1$$

where $T\_wh_1$=Wheel Torque on grade angle=$\theta_1$, $R\_rr$=Driven wheel rolling radius, $M\_v$=vehicle mass estimate, g=gravity constant, $\theta_1$=grade angle for grade 1, and $T\_rl_1$=Road load torque at the driven wheel on grade 1.

$$M\_v = [(T\_wh_1 - T\_wh_2) + (T\_rl_2 - T\_rl_1)] / [R\_rr * g * (\sin \theta_1 - \sin \theta_2)]$$

where $T\_wh_2$=Wheel Torque on grade angle=$\theta_2$, $\theta_2$=grade angle for grade 2, and $T\_rl_2$=Road load torque at the driven wheel on grade 2.

Alternatively, vehicle mass may be determined via vehicle height sensors or via a vehicle accelerometer or mass sensor installed on each wheel support system. For example, if vehicle height is reduced due to an increase in vehicle payload, output of vehicle height sensors is converted to an estimated vehicle mass.

Additionally, if vehicle mass is greater than a baseline vehicle mass plus a predetermined mass, method 400 starts a timer and counts an amount of time since the baseline vehicle mass plus the predetermined mass has been exceeded by a larger vehicle mass. Alternatively, method 400 may accumulate a distance a vehicle has traveled since the baseline vehicle mass plus the predetermined mass has been exceeded by a larger vehicle mass. Method 400 proceeds to 406 after determining vehicle mass.

At 406, method 400 judges whether or not the vehicle has been operating at a mass that is greater than (G.T.) a baseline vehicle mass plus a predetermined mass for more than a threshold amount of time or distance traveled. For example, method 400 may judge whether or not, during the whole life of the vehicle, the mass is greater than the baseline vehicle mass plus a predetermined mass for greater than either 500 hours or 15,000 miles. If method 400 judges that vehicle mass is greater than baseline vehicle mass (e.g., vehicle mass when the vehicle is fully fueled, without passengers, and without payload) plus a predetermined mass, the answer is yes and method 400 proceeds to 408. Otherwise, the answer is no and method 400 proceeds to 420.

In this way, method 400 may improve battery charging and provide a higher battery charge level in response to vehicle mass. However, if the vehicle mass is increased for longer than may be desired, the SOC window limits may be gradually returned to normal or nominal levels (e.g., 35% SOC_low and 65% SOC_high).

At 408, method 400 adjusts limits that define the SOC window. In particular, SOC_max (state of charge maximum level for charging), SOC_high (state of charge where charging power begins to be reduced before charging power reaches zero at SOC_max), SOC_min (state of charge minimum level for discharging), SOC_low (state of charge where discharging power begins to be reduced before discharging power reaches zero at SOC_min) are adjusted to nominal or normal levels that may be predetermined and stored in memory. In one example, normal SOC limits for the SOC window are SOC_max=70, SOC_high=65, SOC_low=35, and SOC_min=30 at nominal 20° C. battery temperature. SOC_max is adjusted to less than or equal to 100% so that the possibility of overcharging the battery is reduced. Further, battery life may be extended by not charging the battery to exceed 100% of capacity every time the battery pack is charged. SOC_min is adjusted to greater than 0% so that the battery is not drained to a level that may cause degradation in battery performance or life. Method 400 proceeds to 410 after the SOC limits are adjusted.

At 410, method 400 operates the battery pack with the SOC limits. By operating the battery pack with the limits from 408, 424, 434, or 438 method 400 limits battery charging to SOC_max, limits battery discharge to SOC_min, limits battery charging power between SOC_high and SOC_max, and limits battery discharging power between SOC_low and SOC_min. The battery pack may also communicate the SOC limits to the vehicle controller so that the vehicle controller limits motor torque based on the SOC limits determined at 408, 424, 434, or 438. For example, the motor torque command may be limited based on battery discharge power between SOC_min and SOC_low. Method 400 proceeds to exit after the battery pack is operated with SOC window limits. The battery pack may also communicate to vehicle controller about possible changes of the battery charge and/or discharge power at various SOC window setting. For example, at normal SOC windows, the charge and discharge power is limited to 35 kW between SOC_low and SOC_high. At extended SOC windows, the charge and discharge power may be increased to 40 kW.

At 420, method 400 determines intermediate variables for determining SOC_max, SOC_high, SOC_low, and SOC_min. In particular, method 400 determines variables MAXIMUM_LOAD_SOC_MAXIMUM, NORMAL_LOAD_SOC_MAXIMUM, MAXIMUM_LOAD_SOC_HIGH, NORMAL_LOAD_SOC_HIGH, MAXIMUM_LOAD_SOC_LOW, NORMAL_LOAD_SOC_LOW, MAXIMUM_LOAD_SOC_MINIMUM, and NORMAL_LOAD_SOC_MINIMUM. The variables are a function of battery temperature and are determined via indexing look-up tables based on battery temperature. MAXIMUM_LOAD_SOC_MAXIMUM represents SOC_max at maximum vehicle mass. NORMAL_LOAD_SOC_MAXIMUM represents SOC_max at normal vehicle mass. MAXIMUM_LOAD_SOC_HIGH represents a SOC_high value at maximum vehicle mass. NORMAL_LOAD_SOC_HIGH represents a SOC_high value at normal vehicle mass. MAXIMUM_LOAD_SOC_LOW represents a SOC_low value at maximum vehicle mass. NORMAL_LOAD_SOC_LOW represents a SOC_low value at normal vehicle mass. MAXIMUM_LOAD_SOC_MINIMUM represents a SOC_min value at maximum vehicle mass. NORMAL_LOAD_SOC_MINIMUM represents a SOC_min at normal vehicle mass. The values stored in the tables may be empirically determined. Method 400 proceeds to 422 after the variable have been determined.

At 422, method 400 determines coefficients for determining SOC_max, SOC_high, SOC_low, and SOC_min. The coefficients take on values ranging from 0 to 1. A value of zero corresponds to a normal vehicle mass. A value of one corresponds to a vehicle at its highest allowed mass. In one example, the coefficients may be determined from the following equation:

coeff=(vehicle_mass−normal_mass)/(maximum_mass−normal_mass)

where coeff is the coefficient value, vehicle_mass is the vehicle's present mass, normal_mass is the baseline vehicle mass plus a predetermined mass, and maximum_mass is the vehicle's maximum rated mass. Method 400 proceeds to 424 after the coefficients are determined. There may be the same or separate coefficients for different state of charge operating thresholds.

At 424, method 400 determines SOC_max, SOC_high, SOC_low, and SOC_min from the following equations:

SOC_max=NORMAL_LOAD_SOC_MAXIMUM*(1−coeff)+MAXIMUM_LOAD_SOC_MAXIMUM*coeff

SOC_high=NORMAL_LOAD_SOC_HIGH*(1−coeff)+MAXIMUM_LOAD_SOC_HIGH*coeff

SOC_low=NORMAL_LOAD_SOC_LOW*(1−coeff)+MAXIMUM_LOAD_SOC_LOW*coeff

SOC_max=NORMAL_LOAD_SOC_MINIMUM*(1−coeff)+MAXIMUM_LOAD_SOC_MINIMUM*coeff

Thus, the variables SOC_max, SOC_high, SOC_low, and SOC_min are a blend of high mass and nominal SOC limits. Method 400 proceeds to 426 after the SOC window limits have been determined.

At 426, method 400 judges whether or not an engine in the hybrid vehicle is operating. However, in some examples, method 400 may simply proceed to 428 whether or not the engine is operating. If method 400, judges that the engine is operating, the answer is yes and method 400 proceeds to 428. Otherwise, the answer is no and method 400 proceeds to 410.

At 428, method 400 determines ambient humidity level. Ambient humidity level may be determined from output of a humidity sensor. Method 400 proceeds to 430 after ambient humidity level is determined.

At 430, method 400 determines ambient barometric pressure. Ambient barometric pressure may be determined from output of a barometric pressure sensor. Method 400 proceeds to 432 after ambient humidity level is determined.

At 432, method 400 judges whether or not maximum engine power output is affected by the present barometric pressure by more than a threshold amount of power. The engine may produce maximum power output at sea level and engine power output decreases as the vehicle increases in altitude where barometric pressure is lower. If method 400 judges that maximum engine power output may be affected by the present barometric pressure by more than a threshold amount of engine power (e.g., 3% engine power output reduction) the answer is yes and method 400 proceeds to 434. Otherwise, the answer is no and method 400 proceeds to 436.

At 434, method 400 adjusts SOC window limiting variables SOC_max, SOC_high, SOC_low, and SOC_min in response to barometric pressure. In one example, method 400 may modify the variable coeff at 422 and recalculate the SOC window limit parameters at 424. The value of coeff is still constrained to a value between 0 and 1. A decrease in barometric pressure may increase the value of the variable coeff toward the value of one. An increase in barometric pressure may decrease the value of variable coeff toward the value of zero.

In other examples, SOC window limiting variables are adjusted via an offset that is scaled with decreasing barometric pressure (e.g., adjusted proportionately). For example, the offset may range from a value of 0 to 5 and the offset value added to the SOC window limiting variables is increased from 0 to 5 over a barometric pressure range from 100 kPa to 25 kPa. Therefore, if barometric pressure is 25 kPa, the value of the SOC window limiting variable may be increased by 5 so that the SOC limit is increased by 5%. In some examples, a specific unique barometric pressure adjustment may be provided for each SOC window limiting variable and each unique barometric pressure adjustment may be a different value than the other barometric pressure adjustments. Further, the SOC window limiting variables may be limited to predetermined values so that adjustments for vehicle mass, barometric pressure, and humidity do not exceed predetermined values (e.g., 97% SOC). Method 400 proceeds to 436 after the SOC window limiting variables are adjusted for barometric pressure.

At 436, method 400 judges whether or not engine knock limited spark timing is affected by the present humidity level such that engine maximum power output is reduced by more than a threshold amount of power. The engine may produce maximum power output at higher humidity levels (e.g., 90%); however, if air temperature is high and humidity is low (e.g., 20%), maximum engine power may be reduced because of engine knock. Spark timing may be retarded to prevent engine knock. Consequently, engine maximum power may be reduced as spark timing is retarded from minimum spark timing for best torque (MBT). If method 400 judges that maximum engine power output may be affected by the present humidity level and ambient temperature by more than a threshold amount of engine power (e.g., 3% engine power output reduction) the answer is yes and method 400 proceeds to 438. Otherwise, the answer is no and method 400 proceeds to 410.

At 438, method 400 adjusts SOC window limiting variables SOC_max, SOC_high, SOC_low, and SOC_min in response to ambient humidity and temperature. In one example, method 400 may modify the variable coeff at 422 and recalculate the SOC window limit parameters at 424. The value of coeff is still constrained to a value between 0 and 1. A decrease in humidity and an increase in temperature may increase the value of the variable coeff toward the value of one. An increase in humidity and a decrease in temperature may decrease the value of variable coeff toward the value of zero.

In other examples, SOC window limiting variables are adjusted via an offset that is scaled with decreasing humidity level (e.g., adjusted proportionately). For example, the offset may range from a value of 0 to 5 and the offset value added to the SOC window limiting variables is increased from 0 to 5 over a humidity range from 20% to 95%. Therefore, if humidity is 20%, the value of the SOC window limiting variable may be increased by 5 so that the SOC limit is increased by 5%. In some examples, a specific unique humidity adjustment may be provided for each SOC window limiting variable and each unique humidity adjustment may be a different value than the other humidity adjustments. In some examples, the SOC window limit variables may be adjusted in response to a variable that is adjusted for both ambient humidity and temperature. The SOC window limit variables increase the SOC window range when engine output power may be reduced by low ambient humidity and high ambient temperature. The SOC window limit variable decrease the SOC window range when engine output power may be increased by high ambient humidity and low ambient temperature. Further, the SOC window limiting variables may be limited to predetermined values so that adjustments for vehicle mass, barometric pressure, and humidity do not exceed predetermined values (e.g., 97% SOC). Method 400 proceeds to 410 after the SOC window limiting variables are adjusted for humidity level.

In this way, SOC window limits may be adjusted to improve vehicle performance and range when environmental conditions may reduce engine output torque. Further, if the vehicle mass or load is increased, SOC window limits may be adjusted to increase assistance provided to an engine via a motor by increasing the amount of charge that may be supplied to the motor (e.g., discharge conditions) and by increasing the rate charge is supplied to the motor. SOC window limit adjustments also may affect battery charging so that additional charge may be stored in the battery pack to extend the time charge may be supplied to the motor that assists the engine.

Thus, the SOC window limiting variables may be adjusted accordingly: For an increase in vehicle mass, SOC_max and SOC_high may be increased while SOC_low and SOC_min are decreased to extend the SOC window. For decreases in vehicle mass, SOC_max and SOC_high may be decreased while SOC_low and SOC_min are increased to shrink the SOC window. For a decrease in ambient barometric pressure, SOC_max and SOC_high may be increased while SOC_low and SOC_min are decreased to extend the SOC window. For increases in ambient barometric pressure, SOC_max and SOC_high may be decreased while SOC_low and SOC_min are increased to shrink the SOC window. For a decrease in ambient humidity, SOC_max and SOC_high may be increased while SOC_low and SOC_min are decreased to extend the SOC window. For increases in ambient humidity, SOC_max and SOC_high may be decreased while SOC_low and SOC_min are increased to shrink the SOC window.

Thus, the method of FIGS. 4 and 5 provides for a method for operating a battery pack, comprising: adjusting an available amount of battery pack output power in response to vehicle mass. The method further comprises adjusting the output power of the battery pack in response to environmental conditions that affect torque of an engine. The method includes where the vehicle mass includes mass of a trailer mechanically coupled to the vehicle. The method further comprises adjusting battery pack state of charge operating thresholds in response to vehicle mass. The method includes where adjusting the available amount of battery pack output power includes decreasing the available amount of battery pack output power in response to a decrease in vehicle mass. The method further comprises reducing the available amount of battery pack output power in response to no change in vehicle mass after a predetermined duration.

Figure 6A:
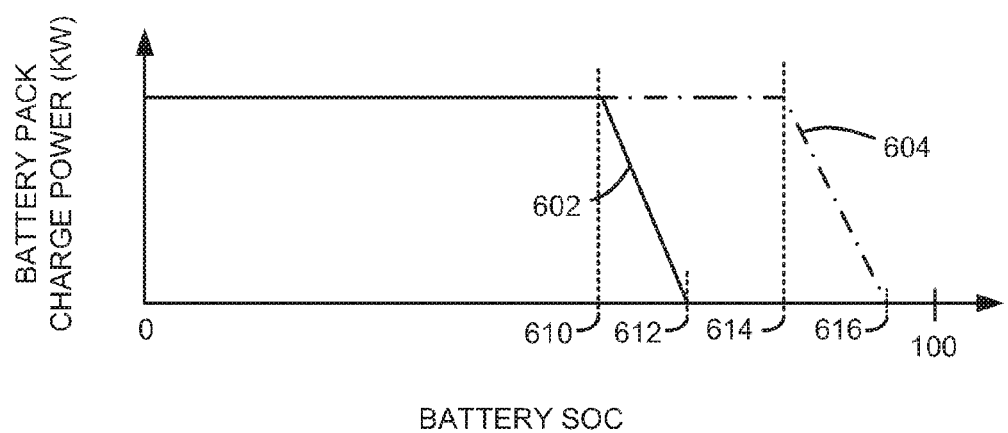
FIGS. 6A and 6B show example battery pack state of charge windows.

Referring now to FIG. 6A, an example plot of SOC window limits SOC_high and SOC_max is shown. The X axis represents battery pack SOC and SOC is an expression of available battery pack capacity. For example, a SOC value of 50 or 50% represents 50% of the battery pack's rated charge capacity is stored in the battery pack. SOC ranges from 0 at the Y axis to 100 at the end of the X axis.

The Y axis represents battery pack charging power for the SOC window limits. The battery pack charging power is an amount of power the battery pack may receive. The battery pack charging power varies with SOC as shown. The battery pack charging power increases in the direction of the Y axis arrow.

Solid line 602 represents SOC window limits as defined by SOC_max and SOC_high for nominal conditions (e.g., no increased vehicle mass, high humidity, and high barometric pressure). SOC_max for these conditions is at 612. SOC_high for these conditions is at 610. Notice that the battery charging power is reduced from SOC_high at 610 to SOC_max at 612. Therefore, when the battery is charging during nominal conditions, battery charging power is reduced after battery SOC reaches SOC_high at 610. Battery charging power is zero at SOC_max at 612.

Dash-dot line 604 represents SOC window limits as defined by SOC_max and SOC_high for non-nominal conditions (e.g., increased vehicle mass, low humidity, and low barometric pressure). SOC_max for these conditions is at 616. SOC_high for these conditions is at 614. Again, notice that the battery charging power is reduced from SOC_high at 614 to SOC_max at 616. Therefore, when the battery is charging during non-nominal conditions, battery charging power is reduced after battery SOC reaches SOC_high at 614. Battery charging power is zero at SOC_max at 616. Dash-dot line 604 represents an increase in the SOC window limits. Increasing the SOC window limits increases the amount of charge the battery receives and the rate of power the battery receives.

Figure 6B:
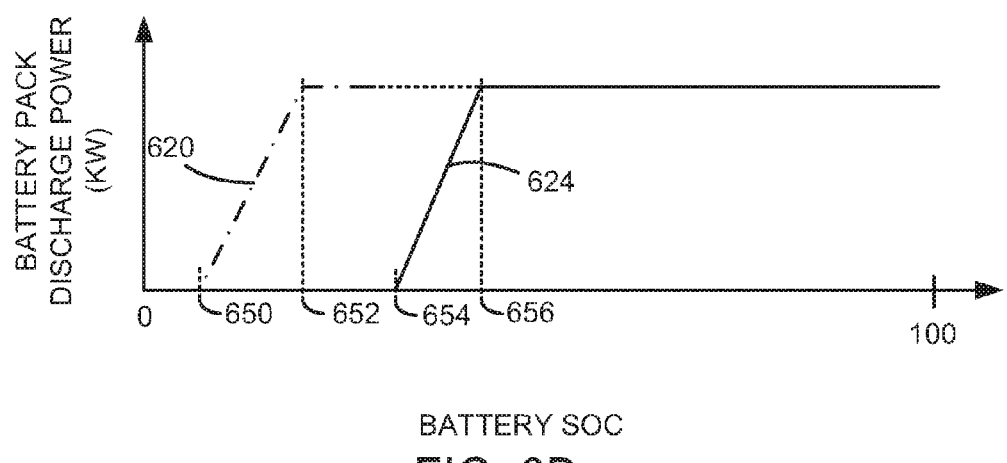

Referring now to FIG. 6B, an example plot of SOC window limits SOC_low and SOC_min is shown. The X axis represents battery pack SOC and SOC is an expression of available battery pack capacity. SOC ranges from 0 at the Y axis to 100 at the end of the X axis.

The Y axis represents battery pack discharging power for the SOC window limits. The battery pack discharging power is an amount of power the battery pack may output. The battery pack discharging power varies with SOC as shown. The battery pack discharging power increases in the direction of the Y axis arrow.

Solid line 624 represents SOC window limits as defined by SOC_min and SOC_low for nominal conditions (e.g., no increased vehicle mass, high humidity, and high barometric pressure). SOC_min for these conditions is at 654. SOC_low for these conditions is at 656. Notice that the battery discharging power is reduced from SOC_low at 656 to SOC_min at 654. Therefore, when the battery is discharging during nominal conditions, battery discharging power is reduced after battery SOC reaches SOC_low at 656. Battery discharging power is zero at SOC_min at 654.

Dash-dot line 620 represents SOC window limits as defined by SOC_min and SOC_low for non-nominal conditions (e.g., increased vehicle mass, low humidity, and low barometric pressure). SOC_min for these conditions is at 650. SOC_low for these conditions is at 652. Again, notice that the battery discharging power is reduced from SOC_low at 652 to SOC_min at 650. Therefore, when the battery is discharging during non-nominal conditions, battery discharging power is reduced after battery SOC reaches SOC_low at 652. Battery discharging power is zero at SOC_min at 650. Dash-dot line 620 represents a decrease in the SOC window limits. Decreasing the SOC window limits increases the amount of discharge the battery provides and the rate of power the battery is drawn from the battery pack.

In this way, battery pack SOC window limits may be adjusted to increase and/or decrease battery charging. Further, SOC window limits may be adjusted to increase or decrease the rate of battery charging and/or discharging.

The subject matter of the present disclosure includes all novel and nonobvious combinations and subcombinations of the various systems and configurations, and other features, functions, and/or properties disclosed herein. Further, the described actions, operations, methods, and/or functions may graphically represent code to be programmed into non-transitory memory of the computer readable storage medium in the battery control system.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for operating a battery pack of a vehicle, comprising:
   a battery pack including a plurality of battery cells; and
   a controller including non-transitory instructions for adjusting battery pack state of charge operating thresholds in response to environmental conditions that affect power of an engine, the environmental conditions including barometric pressure.

2. The system of claim 1, where the battery pack state of charge operating thresholds include a threshold which represents a highest battery pack state of charge at which the battery pack operates at full battery pack charging power.

3. The system of claim 2, where the environmental conditions include humidity.

4. The system of claim 3, where adjusting battery pack state of charge operating thresholds includes increasing a battery pack charging threshold in response to an environmental condition that decreases power of the engine.

5. The system of claim 4, where adjusting battery pack state of charge operating thresholds includes decreasing a battery pack discharging threshold in response to the environmental condition that decreases power of the engine.

6. The system of claim 5, where adjusting the battery pack state of charge operating thresholds includes increasing a battery pack charging power in response to the environmental condition that decreases power of the engine.

7. The system of claim 6, where adjusting the battery pack state of charge operating thresholds includes increasing a battery pack discharging power in response to the environmental condition that decreases power of the engine.

* * * * *